United States Patent [19]

Huillet

[11] Patent Number: 5,072,355

[45] Date of Patent: Dec. 10, 1991

[54] AC-DC CHOPPER CONVERTER TYPE OF SUPPLY

[75] Inventor: Henri Huillet, Le Haillan, France

[73] Assignee: Sextant Avionique, Meudon La Foret, France

[21] Appl. No.: 614,124

[22] Filed: Nov. 16, 1990

[30] Foreign Application Priority Data

Dec. 12, 1989 [FR] France .................. 89 16396

[51] Int. Cl.$^5$ ............................................. H02M 7/04
[52] U.S. Cl. .................................... 363/89; 363/124; 323/263; 323/284
[58] Field of Search .................. 363/89, 124, 282, 283, 363/284, 266, 16, 17

[56] References Cited

U.S. PATENT DOCUMENTS

| | | | |
|---|---|---|---|
| 4,118,641 | 10/1978 | Lannuzel | 363/124 |
| 4,347,474 | 8/1982 | Brooks et al. | 323/282 |
| 4,591,963 | 5/1986 | Retotar . | |
| 4,720,667 | 1/1988 | Lee et al. | 323/271 |
| 4,814,685 | 3/1988 | Renger | 323/266 |

OTHER PUBLICATIONS

Patent Abstracts of Japan, vol. 7, No. 251 (E-209)(1396), Nov. 8, 1983, & JP-A-58-136265, Aug. 13, 1983, T. Kitajima, "Input/Output Non-Insulating Type Switching Power Source".

Primary Examiner—Steven L. Stephan
Assistant Examiner—Ben Davidson
Attorney, Agent, or Firm—Oblon, Spivak, McClelland, Maier & Neustadt

[57] ABSTRACT

Disclosed is a supply of the AC-DC converter type where the regulation is achieved by successive operations for charging and discharging a capacitor. The supply includes an input oscillator circuit, the period of which is very small as compared with that of the input AC voltage. A first switch is closed during the time necessary for the charging of the capacitor of the oscillator circuit. When it opens, a second switch gets closed to enable the transfer of energy towards the load. The regulation is done by an oscillator circuit which is controlled by an error voltage on the load and which triggers a monostable trigger circuit to close the first switch and open the second one during the period when this monostable trigger circuit is in its quasi-stable state.

2 Claims, 1 Drawing Sheet

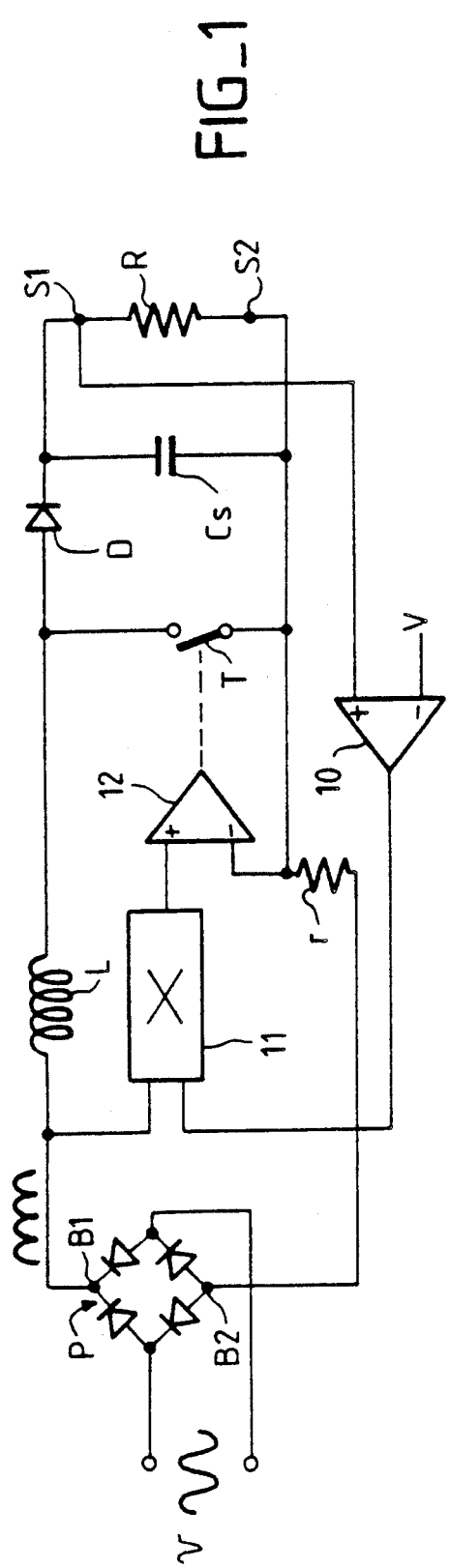
FIG_1
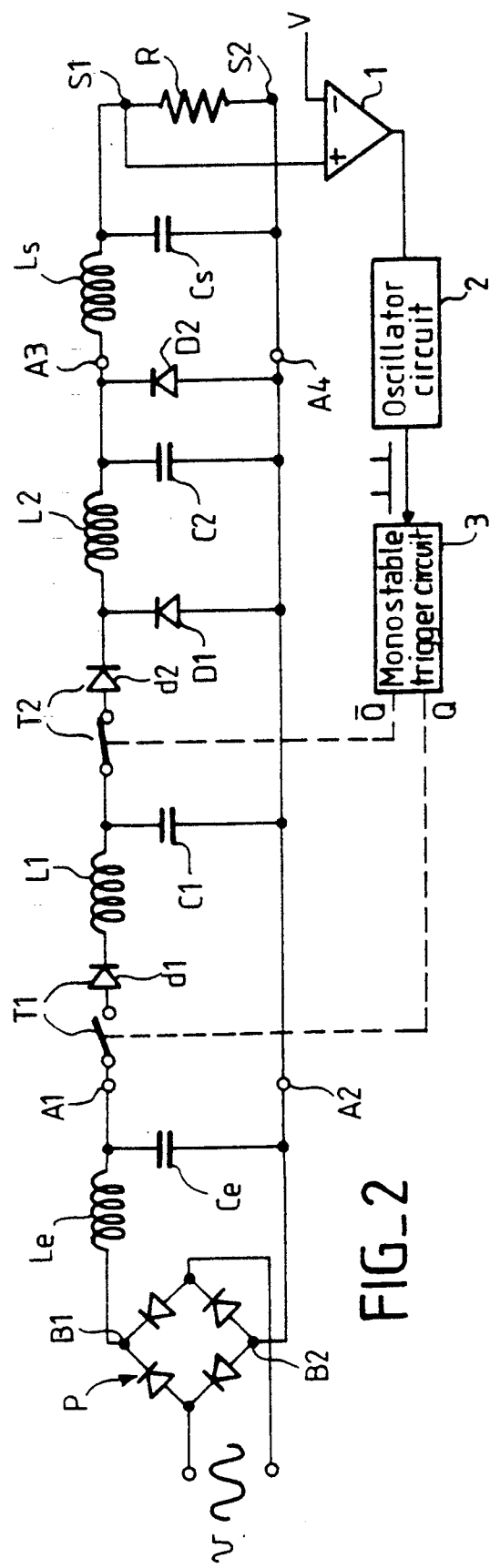
FIG_2

AC-DC CHOPPER CONVERTER TYPE OF SUPPLY

BACKGROUND OF THE INVENTION

1. Field of the Invention

The present invention pertains to an AC-DC chopper converter type of supply, i.e. a supply that converts a voltage delivered by an AC mains network into an output DC supply in using, for this purpose, an input rectifier circuit and, between this circuit and its output, switching means that are controlled as a function of the output voltage of the supply to regulate this output voltage. Furthermore, this supply must consume a sinusoidal current, at the mains network, that is in phase with the voltage in order to optimize the power factor of the supply, i.e. so that the ratio of the necessary active power to the apparent power consumed at the mains network is substantially equal to 1.

2. Description of the Prior Art

Supplies such as this exist and shall be described with reference to FIG. 1 appended hereto. In these known supplies, which are called forced commutation anharmonic chopping supplies, the switch-over is made to take place when currents are flowing in the switching means. The result thereof is losses through switching over, disturbances in the form of current peaks detrimental to the efficient working condition of the components of the supply and disturbances by radiation. Furthermore, these supplies which work at maximum switching-over frequencies of the order of 200 kHz, are relatively bulky.

SUMMARY OF THE INVENTION

The present invention is aimed at circumventing or at least at reducing these drawbacks. This is obtained through switching means positioned and controlled at very high frequencies so that the current that flows through them is zero at the time of their opening and so that their volume is low.

According to the present invention, there is provided an AC-DC chopper converter type of supply comprising, in series, a full-wave rectifier circuit, a high-frequency filter, a quadripole and a low-frequency filter that delivers an output voltage, wherein the quadripole comprises a first input and a second input, a first output and a second output, a first capacitor and a second capacitor having a first terminal and a second terminal, a first unidirectional conductor and a second unidirectional conductor having a first terminal and a second terminal and, after this, between its first input and its first output, a first unidirectional switch, a first inductor, the first terminal of the first capacitor, a second unidirectional switch, the first terminal of the first unidirectional conductor, a second inductor and the first terminal of the second capacitor and of the second unidirectional conductor, the second terminals of the first and second capacitors and of the first and second unidirectional conductors being coupled to the second input and to the second output of the quadripole, and wherein the supply includes an oscillator circuit controlled as a function of the output voltage, to give triggering pulses, and a monostable circuit, the quasi-stable state of which has a duration slightly greater than the inverse value of the resonance frequency of the oscillator circuit formed by the first inductor and the first capacitor, to receive the triggering pulses and activate the closing of the first switch and the opening of the second switch during its quasi-stable state, and vice versa when it is not in its quasi-stable state.

BRIEF DESCRIPTION OF THE DRAWING

The present invention will be understood more clearly and other characteristics will appear from the following description and from the appended figure, wherein:

FIG. 1 is a simplified diagram of a supply according to the prior art;

FIG. 2 is a diagram of a supply according to the invention.

MORE DETAILED DESCRIPTION

FIG. 1 is a simplified diagram of an AC-DC chopper converter type of supply according to the prior art.

A rectifier bridge P gives, between its output terminals B1, B2 and from an input AC voltage, a voltage formed by arches of rectified sinusoidal signals. The terminal B1 is coupled by an inductor L followed by a diode D to one of the two output terminals S1, S2 of the supply. A load R, represented by a resistor, is connected between the terminals S1, S2. The diode D is positioned so as to be on for the current rectified by the bridge P. The terminal B2 is connected to the terminal S2 by a resistor r. A capacitor Cs is connected between the terminals S1, S2. An electronic switch, T, represented by a contact, is mounted between the point common to the inductor L and to the diode D, and the terminal S2. This switch is controlled by a first comparator 12, the "+" input of which is connected to the output of a multiplier circuit 11 and the "−" input of which is connected to the terminal S2. A second comparator 10 has its "+" input connected to the terminal S1 and its "−" input connected to a DC reference voltage V. The output of the comparator 10 is connected to one of the two inputs of the multiplier 11, the other input of which is connected to the terminal B1.

The comparator 12 compares the current that flows in the inductor L, and hence in the resistor r, with a set-value signal which is a rectified sinusoidal signal having the same frequency as that of the mains network and with an amplitude proportional to the power to be transmitted. This set-value signal is obtained by multiplying the value of the rectified voltage, given by the rectifier bridge P, by the result of the comparison made by the comparator 10 between the output voltage of the supply and the reference voltage V.

As shown, the switch T opens and closes at a rate of 100 to 200 kHz. The value of this rate is determined as a function of the value given to the inductance L, and the control of the switch T is adjusted so that the envelope of the current in the inductance L is a rectified sinusoid.

With the assembly according to FIG. 1, the opening and closing of the switch T, which are enforced by the state of the output of the comparator 12 and which occur while currents flow respectively in the switch T and in the diode D, cause switching losses and disturbances in the switch.

FIG. 2 is the diagram of the AC-DC chopper converter type supply, according to the invention.

A rectifier bridge P gives a voltage, formed by arches of rectified sinusoidal signals, between its output terminals B1, B2 and from a 117 volt, 400 Hz input AC voltage v, delivered by a mains network. The terminal B1 is coupled by an inductor Le to an input terminal A1 of a quadripole, the other input terminal of which bears the reference A2 and the output terminals of which bear the references A3 and A4. The terminal B2 is connected to the terminal A2 and is coupled to the terminal A1 by a capacitor Ce.

The terminal A1 is connected to the terminal A3 by a first unidirectional switch T1, followed by an inductor L1, followed by a second unidirectional switch T2, followed by an inductor L2. The unidirectional switches T1 and T2 are transistors respectively controlled by the direct output Q and inverted output Q of a monostable trigger circuit 3; they have been represented in FIG. 2 by a contact in series with a diode: d1 for T1, d2 for T2.

The quadripole has its input terminal A2 connected to these output terminals A4. Its two terminals are coupled by a capacitor C1, a diode D1 and a capacitor C2 in parallel with a diode D2, respectively to the common point of the inductance L1 and of the switch T2, to the common point of the switch T2 and of the inductance L2 and to the terminal A3.

The terminal A3 of the quadripole is coupled to one output terminal, S1, of the two output terminals of the supply by an inductor Ls. The terminal L4 of the quadripole is connected to the terminal S2 of the supply and is coupled by a capacitor Cs to the terminal S1 of the supply. A load R, represented by a resistor, is connected between the supply terminals. The inductor forms a low-pass filter with the capacitor Cs. This low-pass filter is positioned at output of the supply.

A comparator 1 has its "+" input connected to the output terminal S1 of the supply and its "−" input connected to a DC reference voltage source V.

The output of the comparator 1 is connected to the control input of an oscillator 2 which, depending on its control signal, delivers pulses at a frequency that may vary from 0 to 1 MHz. These pulses control the flipping over of the trigger circuit 3.

The duration of the quasi-stable state of the monostable trigger circuit 3 is fixed at 280 ns. For the duration of its quasi-stable state, it activates the closing of the switch T1 and the opening of the switch T2 and does the reverse when it is not in its quasi-stable state.

The current that flows in the switch T1 is a high-frequency semi-sinusoidal current, the duration of which is determined by the resonance frequency of the oscillator circuit formed by the elements L1, C1, and the amplitude of which is proportional to the instantaneous value of the input AC voltage v. The envelope of the current therefore follows, in phase, the rectified sinusoid of the input voltage.

The input high-frequency filter, formed by the elements Le, Ce, makes it possible, by eliminating the high-frequency components of the current flowing in the switch T1, to keep only the sinusoidal envelope of the input current at the frequency, F, of the mains network.

When the switch T1 is closed, the capacitor C1 gets charged sinusoidally, through the inductor L1, up to twice the input voltage. This charging takes place at high frequency, the oscillator circuit L1-C1 having a resonance frequency of 2 MHz. The charging of the capacitor takes place during the quasi-stable state of the trigger circuit 3, and the duration of this state, which is equal to 280 ns, is greater than the half-period of the oscillator circuit L1-C1, i.e. greater than 250 ns. Thus, the capacitor C1 has finished getting charged when the switch T1 opens, i.e. no current flows in this switch when it opens.

The role of the diode d1 is to prevent the discharging of the capacitor C1 by preventing the current in the inductor L1 from getting inverted.

At the opening of T1, the capacitor C1 is charged. At the closing of T2, which is simultaneous with the opening of T1, the energy stored in the capacitor C1 is transferred sinusoidally, at high frequency, through the inductor L2, into the output load R and into the capacitor C2.

The diode d2 prevents the current flowing in the inductor L2 from getting inverted and hence recharging the capacitor C1.

The diode D1, by routing the current of the inductor L2 through itself, prevents the capacitor C1 from getting discharged up to a negative voltage.

In the same way, the diode D2, by routing the current of the inductor Ls through itself, prevents the capacitor C2 from getting charged negatively.

So long as, during a chopping cycle, i.e. during a consecutive closing and opening of the switch T1, the energy stored in the capacitor C1 remains smaller than that consumed by the load R, the capacitor C2 cannot get charged for all the energy stored in the capacitor C1 is entirely consumed by the load R.

When, during a chopping cycle, the energy stored in the capacitor C1 is greater than the energy consumed by the load R, the capacitor C2 gets charged by storing the difference between these two energies and this energy stored in the capacitor C2 is consumed by the load R before any new charging of the capacitor C1, i.e. before a new chopping cycle begins.

This way of regulating the output voltage of the supply is achieved by means of the oscillator circuit 2, the frequency of which is controlled by the output voltage of the comparator 1 which plays the role of an error amplifier in comparing the output voltage of the supply with the reference voltage V; and, as seen here above, the pulses delivered by the oscillator circuit 2 activate the closing of the switch T1 for 280 ns and the opening of the switch T2 for the same period of time.

It must be noted that the comparator 1 includes a low-pass filter at its "+" input so as not to take account of the low residual ripple at the frequency of the mains network shown by the supply output.

The present invention is not restricted to the example described. It is thus, in particular, that a coupling transformer can be inserted into the quadripole, downline of the switch T1. In the same way, the unidirectional switches T1 and T2 may be formed by two distinct elements: a bidirectional switch and a semiconductor element and, in this case, in FIG. 2, the positions taken up by the elements d1 and L1 may be exchanged.

In the same way, in the example described, the resonance frequency of the oscillator circuit L1-C1 has been chosen with a very high value, as compared with that of the AC mains network, since there is a ratio of 5000 between the two frequencies. The ratio between these two frequencies may be lower while, at the same time, remaining greater than 1000, provided that a corresponding reduction is made in the maximum frequency that can be achieved by the oscillator circuit 2 and provided that the duration of the quasi-stable state of the monostable trigger circuit 3 is set so that it remains at least equal to or just a little greater than the half-period of the oscillator circuit L1, C1. However, it must be noted that the power transmitted to the load will be as great as the number of times per second at which the capacitor C1 is charged and discharged is great. This therefore leads to determining the values of L1 and C1 for a maximum chopping frequency of the circuit 2 and for the maximum frequency desired.

What is claimed is:

1. An AC-DC chopper converter type of supply comprising, in series, a full-wave rectifier circuit, a high-frequency filter, a quadripole and a low-frequency filter that delivers an output voltage, wherein the quadripole comprises a first input and a second input, a first output and a second output, a first capacitor and a second capacitor having a first terminal and a second terminal, a first unidirectional conductor and a second unidirectional conductor having a first terminal and a second terminal and, between the quadripoles first input and its first output, a first unidirectional switch, a first inductor, the first terminal of the first capacitor, a second unidirectional switch, the first terminal of the first unidirectional conductor, a second inductor and the first terminal of the second capacitor and of the second unidirectional conductor, the second terminals of the first and second capacitors and of the first and second unidirectional conductors being coupled to the second input and to the second output of the quadripole, and wherein the supply includes an oscillator circuit controlled as a function of the output voltage, to give triggering pulses, and a monostable circuit, a quasi-stable state of which has a duration slightly greater than an inverse value of a resonance frequency of the oscillator circuit formed by the first inductor and the first capacitor, to receive the triggering pulses and activate the closing of the first switch and the opening of the second switch during its quasi-stable state, and vice versa when it is not in its quasi-stable state.

2. A supply according to claim 1, the rectifier circuit of which is connected to a mains network giving an AC voltage with a given frequency, wherein a resonance frequency of the oscillator circuit is more than a thousand times greater than the given frequency.

* * * * *